(12) United States Patent
Blaettner

(10) Patent No.: US 6,452,300 B1
(45) Date of Patent: Sep. 17, 2002

(54) LAMINATED STATOR YOKES

(75) Inventor: Harald E. Blaettner, Ft. Wayne, IN (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/265,166

(22) Filed: Mar. 9, 1999

Related U.S. Application Data
(60) Provisional application No. 60/114,185, filed on Dec. 30, 1998.

(51) Int. Cl.[7] ............................................. H02K 21/26
(52) U.S. Cl. ..................... 310/154.09; 310/42
(58) Field of Search ............... 310/89, 91, 154, 310/254, 154.08, 154.09, 154.12; 29/596–598

(56) References Cited

U.S. PATENT DOCUMENTS

| | | | |
|---|---|---|---|
| 3,054,916 A | * 9/1962 | Cobb | 310/154 |
| 3,422,294 A | * 1/1969 | Parker | 310/154 |
| 3,422,295 A | * 1/1969 | Parker | 310/154 |
| 4,150,312 A | * 4/1979 | Armstrong et al. | 310/42 |
| 4,155,021 A | * 5/1979 | Corbach et al. | 310/154 |
| 4,508,988 A | * 4/1985 | Reiss et al. | 310/154 |
| 4,514,655 A | * 4/1985 | Hosoya | 310/218 |
| 4,571,515 A | * 2/1986 | Baader | 310/154 |
| 4,587,449 A | * 5/1986 | West | 310/154 |
| 4,682,066 A | * 7/1987 | Abbratozzato et al. | 310/154 |
| 4,687,961 A | * 8/1987 | Horber | 310/186 |
| 4,707,630 A | * 11/1987 | Tomite et al. | 310/154 |
| 4,933,585 A | * 6/1990 | Rossi | 310/162 |
| 4,973,871 A | * 11/1990 | Bisantz | 310/154 |
| 5,095,237 A | * 3/1992 | Bardas et al. | 310/90.5 |
| 5,105,114 A | * 4/1992 | Sickle et al. | 310/154 |
| 5,160,867 A | * 11/1992 | Niemela | 310/154 |
| 5,175,460 A | * 12/1992 | Ishizuka | 310/154 |
| 5,268,607 A | * 12/1993 | McManus | 310/89 |
| 5,276,375 A | * 1/1994 | Hartel | 310/154 |
| 5,281,881 A | * 1/1994 | Gentry et al. | 310/154 |
| 5,338,996 A | * 8/1994 | Yamamoto | 310/217 |

* cited by examiner

*Primary Examiner*—Tran Nguyen
(74) *Attorney, Agent, or Firm*—Karl Vick, Esq.; Armstrong Teasdale LLP

(57) ABSTRACT

A stator yoke formed with a plurality of layers of similarly sized metal sheets is disclosed. A plurality of gaps extend through the stator yoke between ends of the metal sheets. The gaps decrease in size from an outer layer to an inner layer of the stator yoke. The stator yoke can be formed to have a limited tolerance even when the metal sheets do not have limited tolerances.

14 Claims, 3 Drawing Sheets

LAMINATED STATOR YOKES

CROSS REFERENCE TO RELATED APPLICATIONS

This application claims the benefit of U.S. Provisional Application No. 60/114,185, filed Dec. 30, 1998.

BACKGROUND OF THE INVENTION

This invention relates generally to electric motors and, more particularly, to stator yokes for electric motors.

An electric motor includes a stator that rotatably supports a rotor. The stator may include a plurality of permanent magnets connected to a stator yoke. Typically, the stator yoke is a tubular member located between the magnets and a stator shell. The stator yoke and the magnets are secured to the stator shell with adhesive, clips, or other attachment devices. The rotor is mounted within a cavity formed by the magnets and includes a plurality of windings.

An air gap extends between the rotor and the magnets. It is desirable for the air gap to be substantially uniform since favorable operating characteristics are then achieved. However, a uniform air gap is not easily provided since variations in the stator yoke can lead to variations in the air gap. Typically, to reduce variations in the stator yoke, a final machining operation is utilized. For example, it is desirable for the stator yoke to have an outer diameter with a final tolerance of about 0.002 inches and an inner diameter with a tolerance of about 0.010 inches. The final machining operation adds additional expense to the cost of fabricating the electric motor and increases the time for fabrication.

Accordingly, it would be desirable to provide a stator yoke that was easy to fabricate and that provided a substantially uniform air gap between the magnets and the rotor. Additionally, it would be desirable if the stator yoke was relatively inexpensive to fabricate and did not require a final machining operation.

BRIEF SUMMARY OF THE INVENTION

These and other objects may be attained by a stator yoke assembly that includes a plurality of layers of similarly sized sheets of metal. The layers are formed into a substantially cylindrical shape with a gap extending between ends of the sheets. One, two, or more sheets can form a single layer.

In one embodiment, the stator yoke is positioned within a shell of an electric motor. A plurality of permanent magnets are attached to the stator yoke and the shell. The layers of the stator yoke are concentric and the gaps in each layer are aligned with gaps in adjacent layers to form an opening that extends radially through the stator yoke. The presence of the gap between ends of the metal sheets eliminates the requirement that the metal sheets have limited tolerances since the stator yoke layers can be formed to have limited tolerances by adjusting the gap in each layer. The stator yoke gaps are beneficial to the demagnetization performance of the motor. Since the layers are concentric and formed from similarly sized sheets of metal, the openings in the stator yoke decrease in size from an outer stator yoke layer to an inner stator yoke layer.

The gaps in the layers of the stator yoke allow the layers to be formed with limited tolerances without requiring a final machining step to provide a limited tolerance to the metal sheets. The fabrication expense of the metal sheets is thus reduced without reducing the performance of the electric motor. In addition, the stator yoke is easy to assemble.

DETAILED DESCRIPTION OF THE INVENTION

Figure 1:
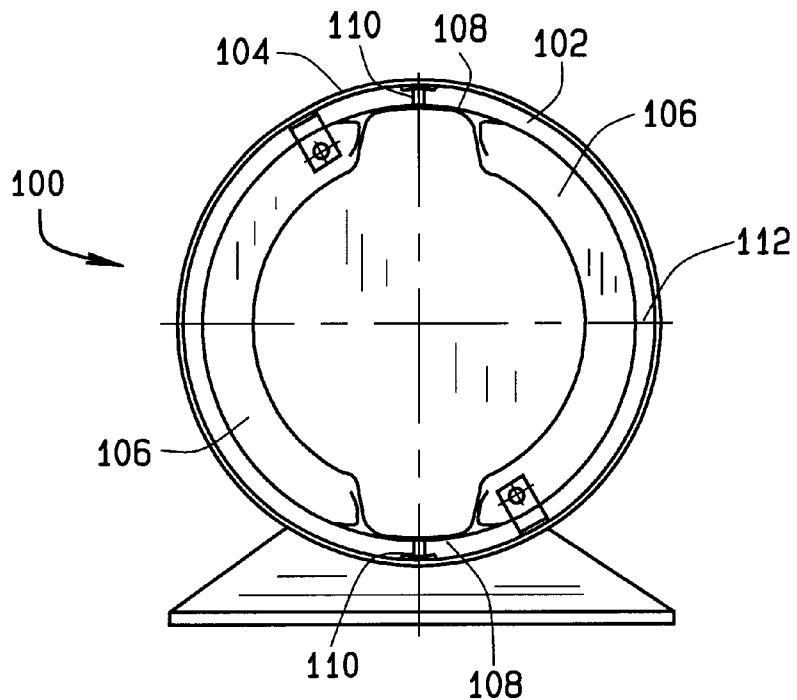
FIG. 1 is an end view of a known stator assembly.

FIG. 1 is an end view of a stator assembly 100 well known in the art including a stator yoke 102. Stator assembly 100 includes a shell 104 surrounding stator yoke 102. Stator assembly 100 also includes magnets 106 and magnet clips 108. Clips 108 are positioned between magnets 106 and connect magnets 106 to stator yoke 102 by rivets 110 that extend through clips 108 and stator yoke 102. Alternatively, rivets 110 could be bolts, screws, pins or other fasteners.

Stator yoke 102 is tubular shaped and is positioned between stator shell 104 and magnets 106. Stator yoke 102 typically includes a weld seam 112 positioned adjacent a center of one of magnets 106. Due to the tubular shape of stator yoke 102, stator yoke 102 is fabricated with limited tolerances to provide the required size. The fabrication of stator yoke 102 with a limited tolerance often requires a final machining operation. The sizing of stator yoke 102 is important since magnets 106 are held in place by stator yoke 102. In particular, an outer diameter of stator yoke 102 provides for controlled interference with shell 104. Additionally, magnets 106 should be a fixed distance from a rotor (not shown) positioned within stator assembly 100 for the rotor to operate properly, as is well known in the art.

Figure 2:
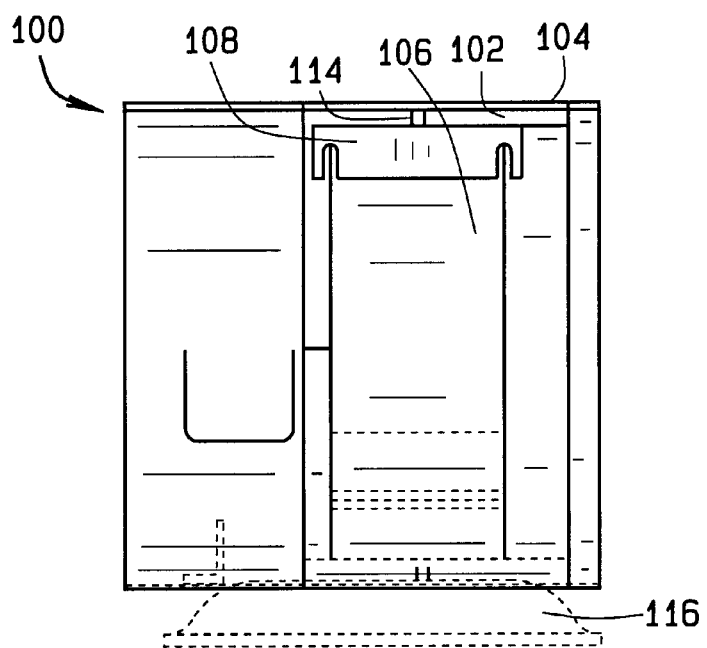
FIG. 2 is a side view of the stator assembly shown in FIG. 1.

FIG. 2 is a side view of stator assembly 100 and illustrates magnets 106 held in place with clips 108. A plurality of rivet openings 114 extend through stator yoke 102 and through clips 108. Rivets (not shown in FIG. 2) are positioned within openings 114 and maintain clips 108 in contact with stator yoke 102. Stator assembly 100 also includes a base 116 that supports stator assembly on a surface (not shown). Base 116 is connected to stator shell 104.

Figure 3:
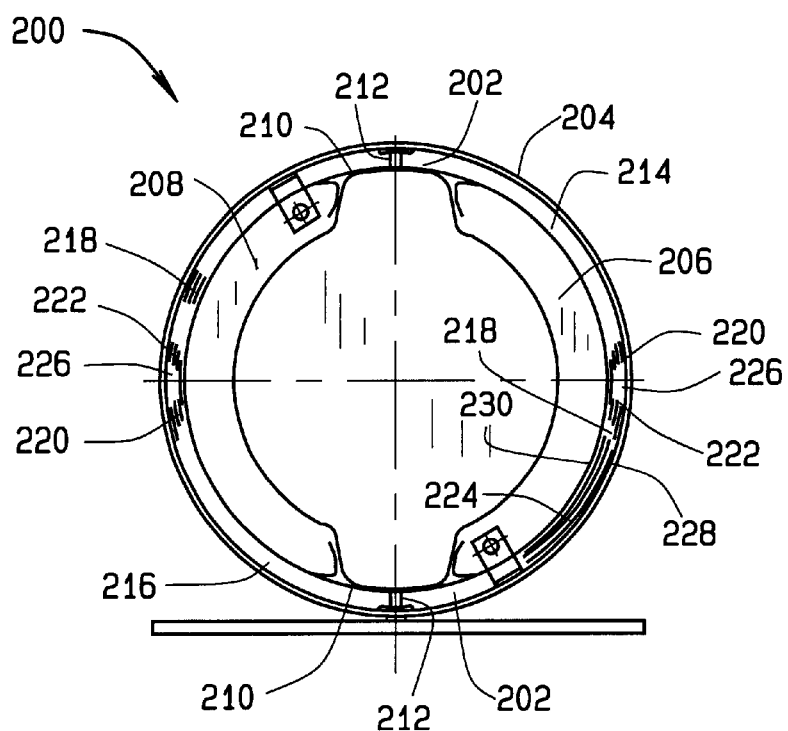
FIG. 3 is an end view of a stator assembly according to one embodiment of the present invention.

FIG. 3 is an end view of a stator assembly 200 according to one embodiment of the present invention. Stator assembly 200 includes a yoke 202 and a shell 204 surrounding stator yoke 202. Stator assembly 200 also includes a first magnet 206, a second magnet 208, and magnet clips 210. Clips 210 are positioned between magnets 206 and 208 and connect magnets 206 and 208 to stator yoke 202 by rivets 212 that extend through clips 210 and stator yoke 202. Alternatively, magnets 206 and 208 could be attached to stator yoke 202 with screws, bolts, or other attachment devices. Further, an adhesive could be used to attach magnets 206 and 208 to stator yoke 202.

Stator yoke 202 is substantially cylindrical and is positioned between stator shell 204 and magnets 206 and 208. Stator yoke 202 includes a first portion 214 and a second portion 216. Each portion 214 and 216 includes a plurality of stacked layers 218 having a first end 220 and a second end 222. Layers 218 are similarly sized and have a length substantially equal to a length of adjacent layers. Each layer 218 includes a pair of metal sheets 224. Gaps 226 extend through stator yoke 202 and between first portion 214 and second portion 216. In an alternative embodiment, one, four, or more sheets of metal can form a single layer with gaps extending through the stator yoke between each metal sheet. The metal sheets can be arranged either circumferentially, axially, or a combination of both. For example, two sets of two substantially semi-cylindrical sheets can be arranged axially in the stator shield thus utilizing four metal sheets to form a single layer.

Since layers 218 are similarly sized, gaps 226 between ends 220 and 222 of layer 218 closest to magnets 206 and 208 are smaller than gaps 226 between ends 220 and 222 of layer 218 closest to stator shell 204. In addition, gaps 226 generally decrease in size from an outer layer 228 of stator yoke 204 to an inner layer 230 of stator yoke 204. Portions 214 and 216 terminate adjacent a center 232 and 234 of magnets 206 and 208, respectively, allowing gaps 226 to be adjacent centers 232 and 234 of magnets 206 and 208. It has been found that gaps 226 do not detrimentally effect performance of an electric motor (not shown) fabricated with stator assembly 200 if gaps 226 are positioned at centers 232 and 234 of magnets 206 and 208. In fact, gaps 226 even enhance demagnetization performance of the electric motor.

Figure 4:
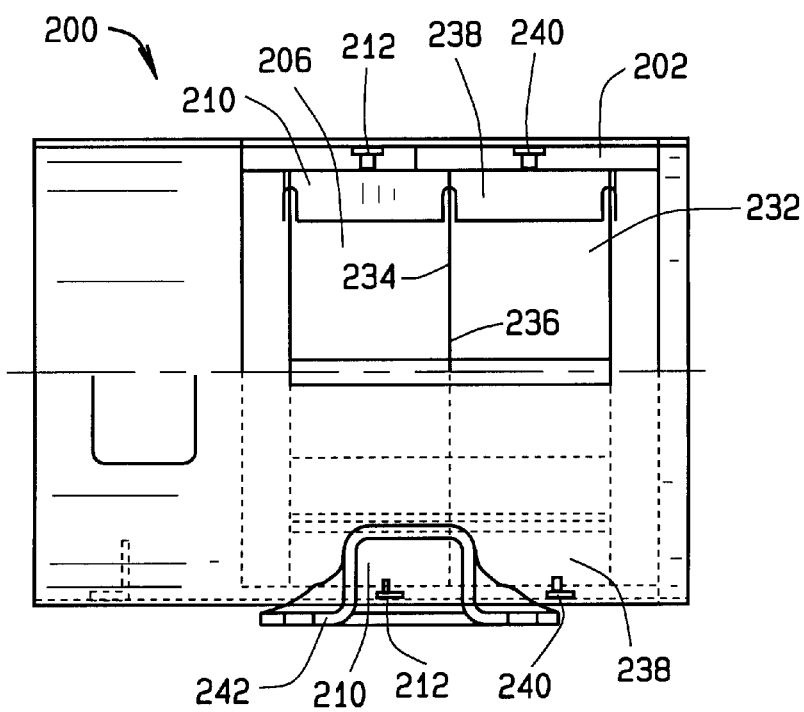
FIG. 4 is a side view of the stator assembly shown in FIG. 3.

FIG. 4 is a side view of stator assembly 200 and illustrates stator assembly 200 having two magnet rows and including four magnets (only two magnets 206 and 236 are shown). A first side 238 of magnet 206 is in contact with a second side 240 of magnet 236. Magnets 206 and 236 are each in contact with stator yoke 202. Clips 210 and rivets 212 hold magnet 206 in place while clips 242 and rivets 244 hold magnet 236 in place. Stator assembly 200 also includes a base 246 that supports stator assembly 200 on a surface (not shown). Base 246 is connected to stator shell 204. Alternatively, stator assembly 200 could include only one magnet row, or three or more magnet rows.

A method for assembling stator assembly 200 includes the step of positioning stator yoke first portion 214 and second portion 216 within stator shell 204 such that gaps 226 extend between ends 220 and 222. Magnets 206 and 208 are then placed adjacent stator yoke 202 and are connected to stator yoke 202 and stator shell 204 with retaining clips 210.

Stator yoke portions 214 and 216 are formed, as will be described in greater detail below, by assembling metal sheets 224 into a plurality of layers 218 that include ends 220 and 222. Portions 214 and 216 are then positioned within stator shell 204 so that gaps 226 extend between ends 220 and 222 of portions 214 and 216. Gaps 226 decrease is size from outer layer 228 to inner layer 230 since metal sheets 224 are of similar size. For example, gaps 226 between ends 214 and 216 adjacent magnets 206 and 208 are smaller than gaps 226 between ends 214 and 216 adjacent stator shell 204. Gaps 226 are positioned adjacent the center of one of magnets 206 and 208.

Gaps 226 in stator yoke 202 allow yoke 202 to be formed with a limited tolerance without fabricating metal sheets 224 to have a limited tolerance. Metal sheets 224 can thus be formed of punched lamination steel which reduces the expense of fabricating metal sheets 224 and stator assembly 200.

Figure 5:
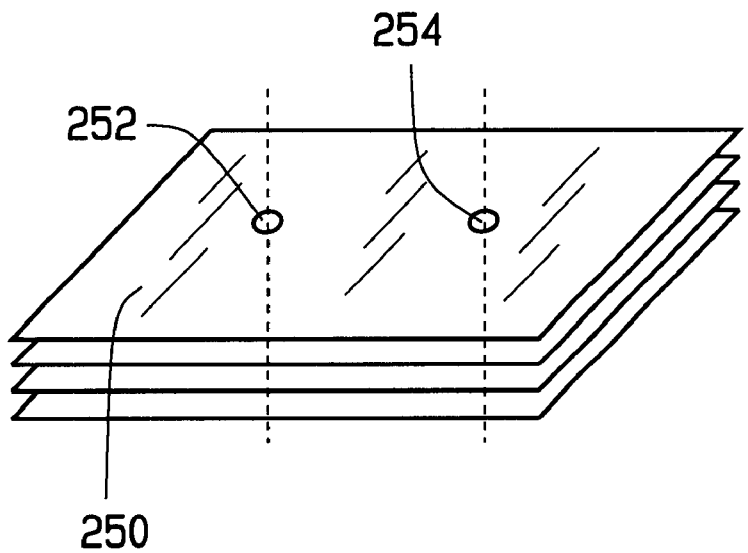
FIG. 5 is a schematic view of a plurality of metal sheets.

FIG. 5 is a schematic view of a plurality of metal sheets 250 before they are formed into a portion of a stator yoke (such as portion 214 of stator yoke 202 shown in FIG. 3). Metal sheets 250 are of equal size and are stacked to a desired thickness, e.g., four sheets. Rivet openings 252 and 254 are provided through each metal sheet 250 and are aligned with each other. In an exemplary embodiment, sheets 250 are stamped, or punched, from laminated steel having a thickness of about 0.025 inches (0.635 millimeters).

Figure 6:
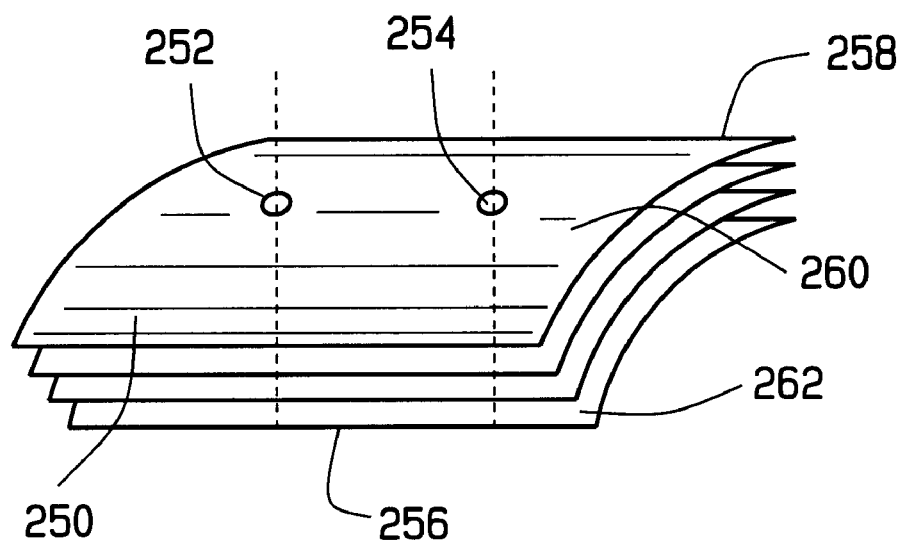
FIG. 6 is a schematic view of the metal sheets shown in FIG. 5 after they have been bent to form a portion of a stator yoke.

FIG. 6 is a schematic view of metal sheets 250 after they have been bent to form a substantially semi-cylindrical shape having a first end 256 and a second end 258. Openings 252 and 254 are aligned throughout the stack of metal sheets 250. Since metal sheets 250 are of equal size and are bent into a substantially semi-cylindrical shape, ends 256 and 258 taper from an outer layer 260 to an inner layer 262. Of course five or more layers, or three or fewer layers, could be used to fabricate the stator yoke. In addition, one, three, or more rivet openings could be provided in metal sheets 250. The number of sheets utilized and the number of rivet openings provided should be chosen in accordance with the number of magnets held by the stator yoke, the desired gap between the metal sheets, and the desired operating characteristics of the electric motor into which the stator yoke is to be placed.

The stator yoke is fabricated from a plurality of similarly sized metal sheets with gaps extending between the metal sheets. The gaps provide for formation of the stator yoke with a limited tolerance without fabricating the metal sheets to have a limited tolerance. The metal sheets can thus be formed from punched lamination steel which reduces the cost of fabricating the stator yoke. In addition, the stator yoke is easy to assemble and position within the stator shell.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. For example, while two stator yoke portions were described, one, four or more stator yoke portions could be utilized. In addition, although two and four magnets were described, more than four magnets could be utilized. Accordingly, the spirit and scope of the invention are to be limited only by the terms of the appended claims.

What is claimed is:

1. A stator assembly for an electric motor, said stator assembly comprising:
   a stator shell;
   a plurality of magnets; and
   a stator yoke between said shell and said magnets, said stator yoke comprising at least one layer each said layer comprising a plurality of similarly sized metal sheets formed into a substantially cylindrical shape, each said sheet having a first end and a second end, wherein a gap extends between said ends of said sheets.

2. A stator assembly in accordance with claim 1 wherein said gap is located adjacent a center of one of said magnets.

3. A stator assembly in accordance with claim 1 wherein said at least one layer comprises a plurality of layers, each said metal sheet having a length substantially equal to a length of an adjacent said metal sheet.

4. A stator assembly in accordance with claim 3 wherein said gap is smaller adjacent said magnets than adjacent said stator shell.

5. A stator assembly in accordance with claim 1 further comprising clips for connecting said magnets to said stator yoke.

6. A stator assembly in accordance with claim 1 wherein said clips are positioned between said magnets.

7. A stator assembly in accordance with claim 1 wherein said metal sheets comprise punched lamination steel.

8. A stator assembly for an electric motor, said assembly comprising:
   a stator shell;

a plurality of magnets; and a stator yoke between said shell and said magnets, said stator yoke comprising a plurality of layers, each said layer comprising a plurality of metal sheets, each said metal sheet having a length substantially equal to a length of an adjacent metal sheet, said magnets connected to said stator yoke and to said stator shell.

9. A stator assembly in accordance with claim 8 wherein said sheets terminate adjacent a center of said magnets.

10. A stator assembly in accordance with claim 8 wherein said stator yoke comprises a plurality of layers, each said layer comprising a first metal sheet and a second metal sheet, each metal sheet having a first end and a second end, wherein gaps extend between said ends of said first metal sheet and said ends of said second metal sheet.

11. A stator assembly in accordance with claim 10 wherein said stator yoke layers have a substantially cylindrical shape.

12. A stator assembly in accordance with claim 10 wherein said stator yoke further comprises an outer layer and an inner layer, said gap decreases in adjacent layers from said outer layer to said inner layer.

13. A stator assembly in accordance with claim 8 further comprising clips, wherein said clips connect said magnets to said stator yoke.

14. A stator assembly in accordance with claim 8 wherein each said metal sheet comprises punched lamination steel.

* * * * *